United States Patent
Kunieda

(10) Patent No.: US 9,648,232 B2
(45) Date of Patent: May 9, 2017

(54) IMAGE PROCESSING APPARATUS, IMAGE CAPTURING APPARATUS, CONTROL METHOD AND RECORDING MEDIUM

(71) Applicant: CANON KABUSHIKI KAISHA, Tokyo (JP)

(72) Inventor: Shutaro Kunieda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 14/605,561

(22) Filed: Jan. 26, 2015

(65) Prior Publication Data

US 2015/0215544 A1    Jul. 30, 2015

(30) Foreign Application Priority Data

Jan. 29, 2014  (JP) ................. 2014-014743

(51) Int. Cl.
*H04N 5/232* (2006.01)
*G06T 5/10* (2006.01)
*G06T 5/00* (2006.01)

(52) U.S. Cl.
CPC ......... *H04N 5/23235* (2013.01); *G06T 5/002* (2013.01); *G06T 5/10* (2013.01)

(58) Field of Classification Search
CPC .............. H04N 5/23235; H04N 5/217; H04N 5/35509; H04N 5/23232; H04N 5/367; H04N 5/23229; G06T 5/002; G06T 5/10; G06T 5/50; G06T 7/0085; G06T 2207/20016; G06T 2207/20192; G06T 2207/20208; G06T 11/60; G06T 3/40; G06T 2207/20221

See application file for complete search history.

(56) References Cited

U.S. PATENT DOCUMENTS

| | | | | |
|---|---|---|---|---|
| 6,829,385 B2* | 12/2004 | Nakase | .................. | G06T 9/007 358/474 |
| 6,833,868 B1* | 12/2004 | Meynants | .............. | H04N 1/486 348/222.1 |
| 7,834,917 B2* | 11/2010 | Kinoshita | ............. | G06T 3/4023 348/241 |
| 8,194,160 B2* | 6/2012 | Tsuruoka | ................ | G06T 5/009 348/222.1 |
| 2004/0028271 A1* | 2/2004 | Pollard | .................... | H04N 1/58 382/162 |
| 2006/0192860 A1* | 8/2006 | Atsumi | .............. | H04N 1/33307 348/222.1 |

(Continued)

FOREIGN PATENT DOCUMENTS

JP    2005-142707 A    6/2005

*Primary Examiner* — Roberto Velez
*Assistant Examiner* — Tuan Le
(74) *Attorney, Agent, or Firm* — Cowan, Liebowitz & Latman, P.C.

(57) ABSTRACT

An image processing apparatus generates a plurality of frequency range images by separating an image based on an obtained image signal into predetermined frequency ranges. The apparatus applies predetermined image processing to the plurality of frequency range images, and generates an image for saving based on the plurality of images. The apparatus generates an image for display based on some of the plurality of frequency range images to which the predetermined image processing has been applied.

16 Claims, 5 Drawing Sheets

(56) References Cited

U.S. PATENT DOCUMENTS

| | | | |
|---|---|---|---|
| 2007/0097236 A1* | 5/2007 | Yoo | H04N 1/409 348/241 |
| 2007/0229710 A1* | 10/2007 | Park | H04N 19/86 348/618 |
| 2008/0122953 A1* | 5/2008 | Wakahara | G06T 5/10 348/241 |
| 2008/0175510 A1* | 7/2008 | Matsushita | H04N 1/409 382/260 |
| 2012/0127216 A1* | 5/2012 | Kimura | G09G 3/2022 345/690 |
| 2012/0147226 A1* | 6/2012 | Takatori | H04N 5/367 348/246 |
| 2012/0328152 A1* | 12/2012 | Bamba | G06T 3/0062 382/103 |
| 2015/0215544 A1* | 7/2015 | Kunieda | G06T 5/002 348/333.01 |

* cited by examiner

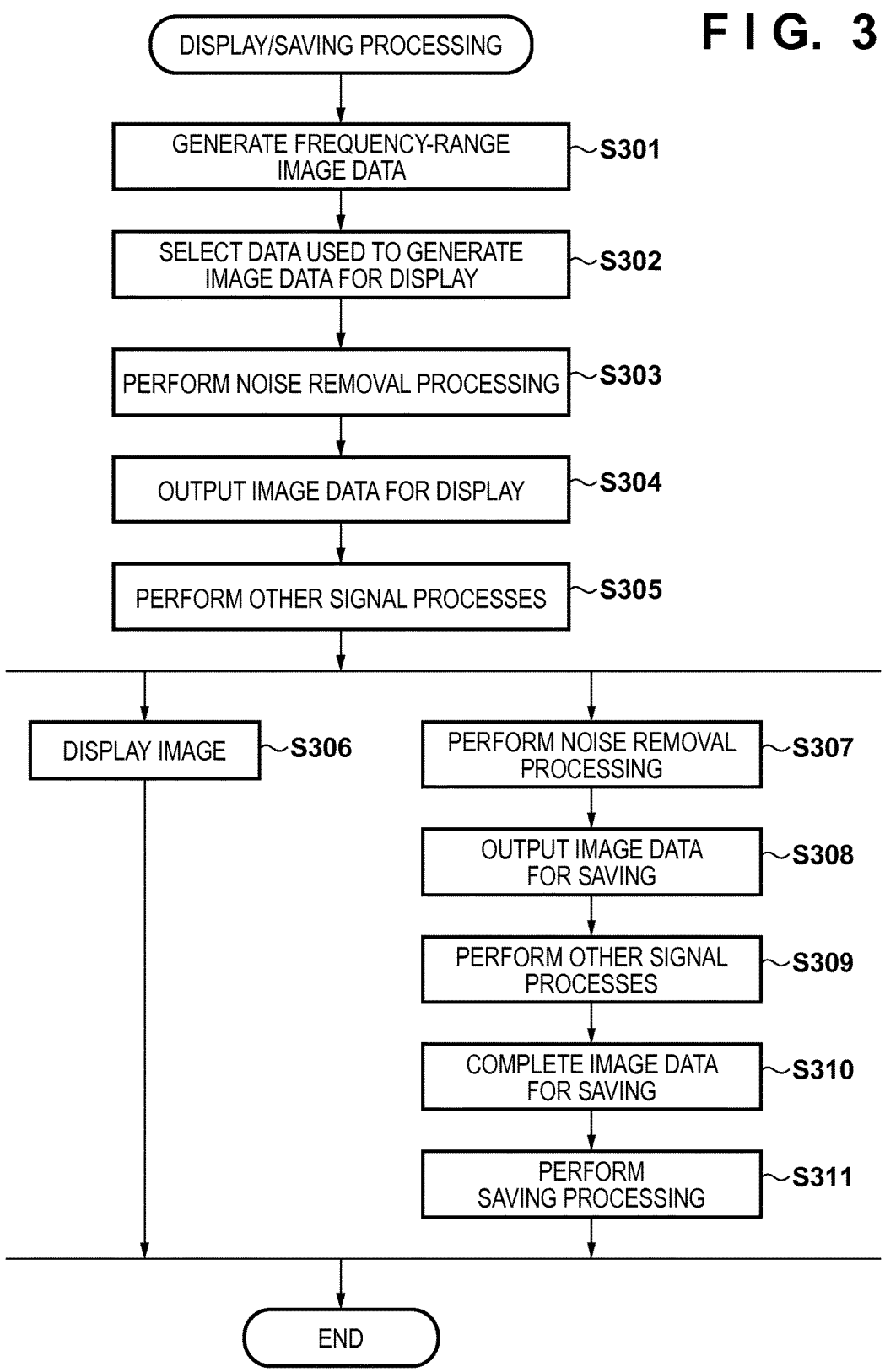

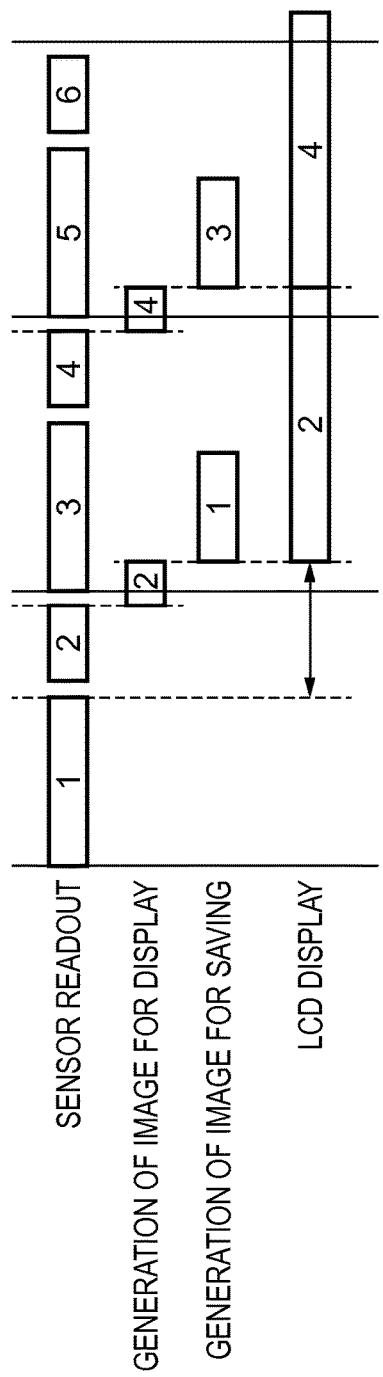
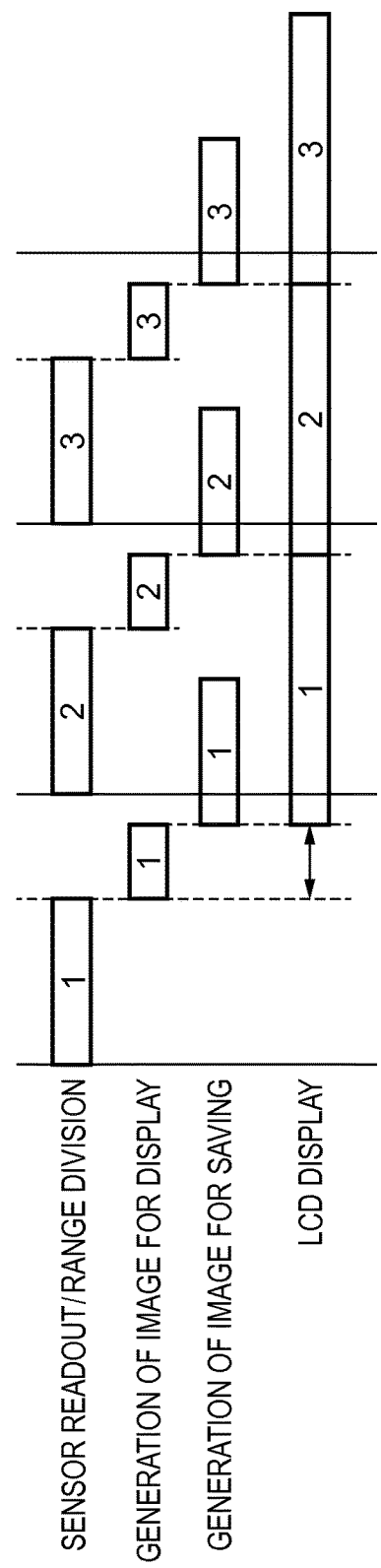

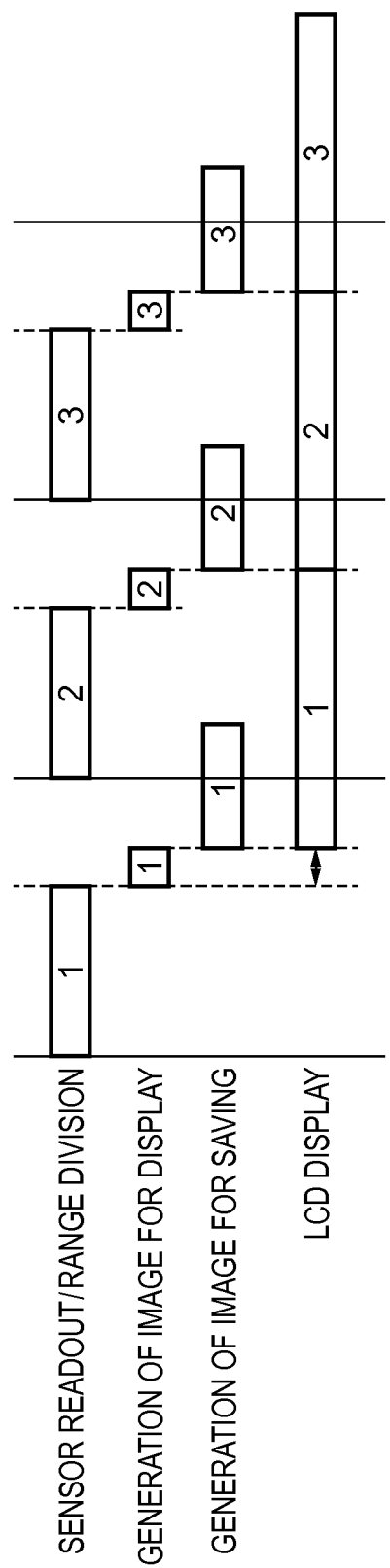

IMAGE PROCESSING APPARATUS, IMAGE CAPTURING APPARATUS, CONTROL METHOD AND RECORDING MEDIUM

BACKGROUND OF THE INVENTION

Field of the Invention

The present invention relates to an image processing apparatus, an image capturing apparatus, a control method, and a recording medium, and particularly to a display technique regarding an electronic viewfinder.

Description of the Related Art

Some of image capturing apparatuses such as a digital camera implement a viewfinder function (electronic viewfinder) by displaying a captured image on the display device of the image capturing apparatus. Recently, there is an image capturing apparatus that is not equipped with an optical viewfinder and uses only the electronic viewfinder. An image presented as the electronic viewfinder in such an apparatus has high importance.

Japanese Patent Laid-Open No. 2005-142707 discloses a technique of reducing the display delay of of an image regarding the electronic viewfinder during continuous shooting.

An image capturing apparatus in Japanese Patent Laid-Open No. 2005-142707 alternately performs readout of a signal for saving from an image sensor and readout of a signal for the electronic viewfinder, and preferentially performs processing of the latter signal, thereby reducing the display delay of an image regarding the electronic viewfinder. However, the image capturing timing is not coincident between an image for saving and an image for display regarding the electronic viewfinder that are generated by reading out two types of signals, and the synchronism is not ensured.

SUMMARY OF THE INVENTION

The present invention was made in view of such problems in the conventional technique. The present invention provides an image processing apparatus, image capturing apparatus, control method, and recording medium for ensuring the synchronism between an image saved during image capturing/saving and an image displayed as the electronic viewfinder.

The present invention in its first aspect provides an image processing apparatus comprising: an obtaining unit configured to obtain an image signal output by image capturing; a separation unit configured to generate a plurality of frequency range images by separating an image based on the image signal obtained by the obtaining unit into predetermined frequency ranges; an image processing unit configured to apply predetermined image processing to each of the plurality of frequency range images generated by the separation unit; a first generation unit configured to generate an image for saving based on the plurality of frequency range images to which the image processing unit has applied the predetermined image processing; a second generation unit configured to generate an image for display based on some frequency range images, out of the plurality of frequency range images to which the image processing unit has applied the predetermined image processing; and an output unit configured to output one of the image for saving and the image for display.

The present invention in its second aspect provides a method of controlling an image processing apparatus, comprising: an obtaining step of obtaining an image signal output by image capturing; a separation step of generating a plurality of frequency range images by separating an image based on the image signal obtained in the obtaining step into predetermined frequency ranges; an image processing step of applying predetermined image processing to the frequency range images generated in the separation step; a first generation step of generating an image for saving based on the plurality of frequency range images to which the predetermined image processing has been applied in the image processing step; a second generation step of generating an image for display based on some frequency range images, out of the plurality of frequency range images to which the predetermined image processing has been applied in the image processing step; and an output step of outputting one of the image for saving and the image for display.

Further features of the present invention will become apparent from the following description of exemplary embodiments (with reference to the attached drawings).

BRIEF DESCRIPTION OF THE DRAWINGS

FIG. 3 is a flowchart exemplifying display/saving processing to be executed by the digital camera 100 according to the embodiment of the present invention;

FIGS. 4A and 4B are timing charts exemplifying display/saving processes by a conventional method and a method according to this embodiment; and FIG. 5 is a timing chart exemplifying display/saving processing by a method according to a modification.

DESCRIPTION OF THE EMBODIMENTS

[Embodiment]

An exemplary embodiment of the present invention will now be described in detail with reference to the accompanying drawings. An embodiment to be described below will explain an example of applying the present invention to a digital camera capable of performing saving of an image during image capturing/saving, and display of an image regarding the electronic viewfinder, as an example of an image processing apparatus. However, the present invention is applicable to an arbitrary device capable of generating an image for saving and an image for display from an image obtained by image capturing. In this embodiment, "layer-specific processing" is processing of performing noise reduction processing that differs between images separated into a plurality of layers in accordance with the frequency range and selectively extracting, from a plurality of images (frequency range images) after noise reduction, the respective pixels of an image to be output, thereby generating the image.

<<Arrangement of Digital Camera 100>>

Figure 1:
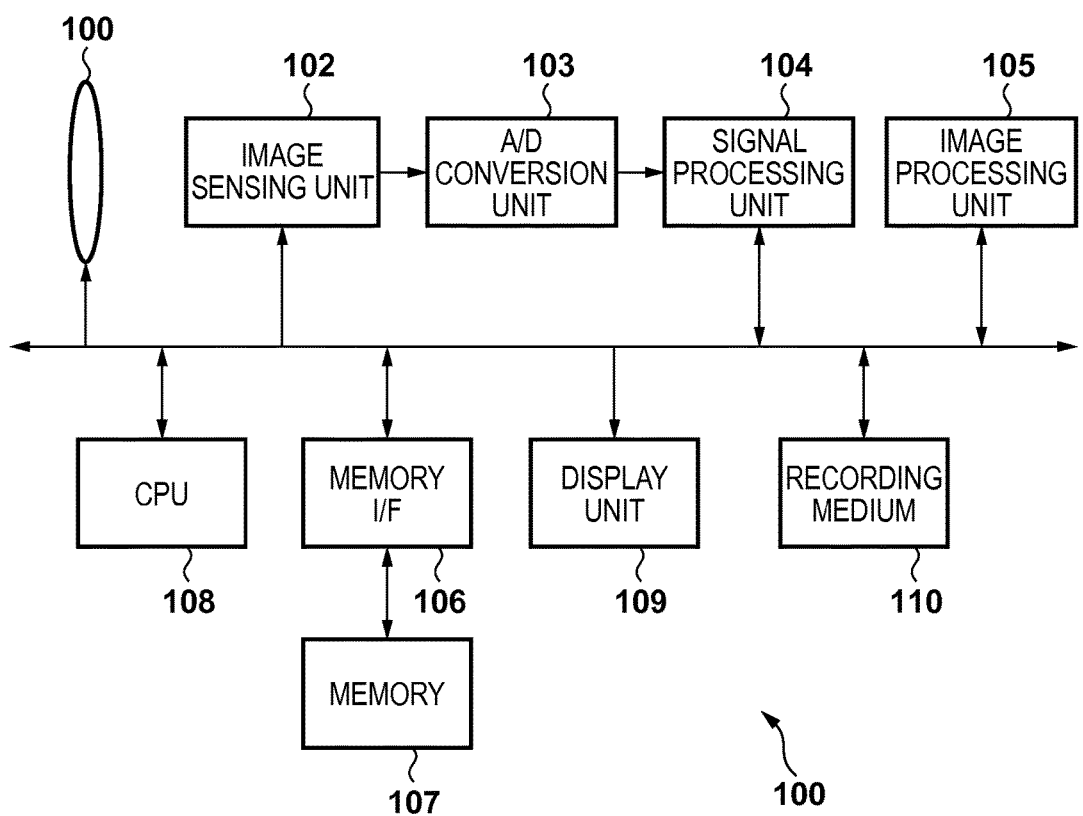
FIG. 1 is a block diagram showing the functional arrangement of a digital camera 100 according to an embodiment of the present invention.

FIG. 1 is a block diagram showing the functional arrangement of a digital camera 100 according to the embodiment of the present invention.

A CPU 108 controls the operation of each block of the digital camera 100. In this embodiment, the CPU 108 will be explained as a programmable processor including a ROM and RAM (neither is shown). The CPU 108 controls the operation of each block by reading out the operation program of the block that is stored in the ROM, and expanding and executing it in the RAM.

An image sensing unit 102 is an image sensor such as a CCD or CMOS sensor. The image sensing unit 102 photoelectrically converts an optical image formed on the light receiving surface of the image sensor by an imaging optical system 101, thereby outputting an analog image signal. The imaging optical system 101 includes a lens and a stop. A driving unit (not shown) that performs driving in accordance with a control signal output from the CPU 108 performs operation control of the imaging optical system 101 regarding focus adjustment and exposure adjustment.

An A/D conversion unit 103 applies A/D conversion processing to the analog image signal output from the image sensing unit 102, thereby generating digital image data. The digital image data generated by the A/D conversion unit 103 is so-called RAW data obtained by simply applying A/D conversion to an analog image signal. This embodiment assumes that the image sensor of the image sensing unit 102 is constituted by arranging photoelectric conversion elements in accordance with a so-called Bayer array, and the color components of the respective pixels of RAW data obtained by the A/D conversion unit 103 comply with the Bayer array. That is, when color filters applied to the respective pixels of the image sensor are primary colors R, G, and B, RAW data is so-called dot-sequential data in which each pixel has only information about one of R, G, and B.

A signal processing unit 104 applies various signal processes to the RAW data output from the A/D conversion unit 103. The signal processing unit 104 applies processes such as noise removal processing, gamma processing, interpolation processing, and matrix transformation to the RAW data. In this embodiment, the signal processing unit 104 performs even the above-mentioned layer-specific processing. In addition, the signal processing unit 104 performs development processing (synchronization processing) of converting RAW data in which each pixel has only the pixel value of one of the R, G, and B color components, into normal image data in which each pixel has the pixel values of all the R, G, and B color components. The image data obtained by performing various signal processes by the signal processing unit 104 is stored in a memory 107 via a memory I/F 106.

An image processing unit 105 performs, on the image data stored in the memory 107, necessary processes such as image processing and encoding processing corresponding to an application purpose. In this embodiment, the image processing unit 105 performs image processing regarding color conversion and enlargement/reduction of image data, and encoding processing complying with a predetermined recording format.

A display unit 109 is a display device, for example, an LCD or the like, in the digital camera 100. The display unit 109 functions as an electronic viewfinder by displaying image data corresponding to an image signal obtained by image capturing.

A recording medium 110 is, for example, the built-in memory of the digital camera 100, or a recording device detachably connected to the digital camera 100, such as a memory card or HDD. When the digital camera 100 performs shooting, image data for saving that has been generated by the image processing unit 105 is saved on the recording medium 110.

This embodiment will explain that each block serving as hardware in the digital camera 100 implements processing. However, the practice of the present invention is not limited to this, and processing of each block may be implemented by a program that performs the same processing as that of the block.

<<Layer-Specific Processing>>

Figure 2:
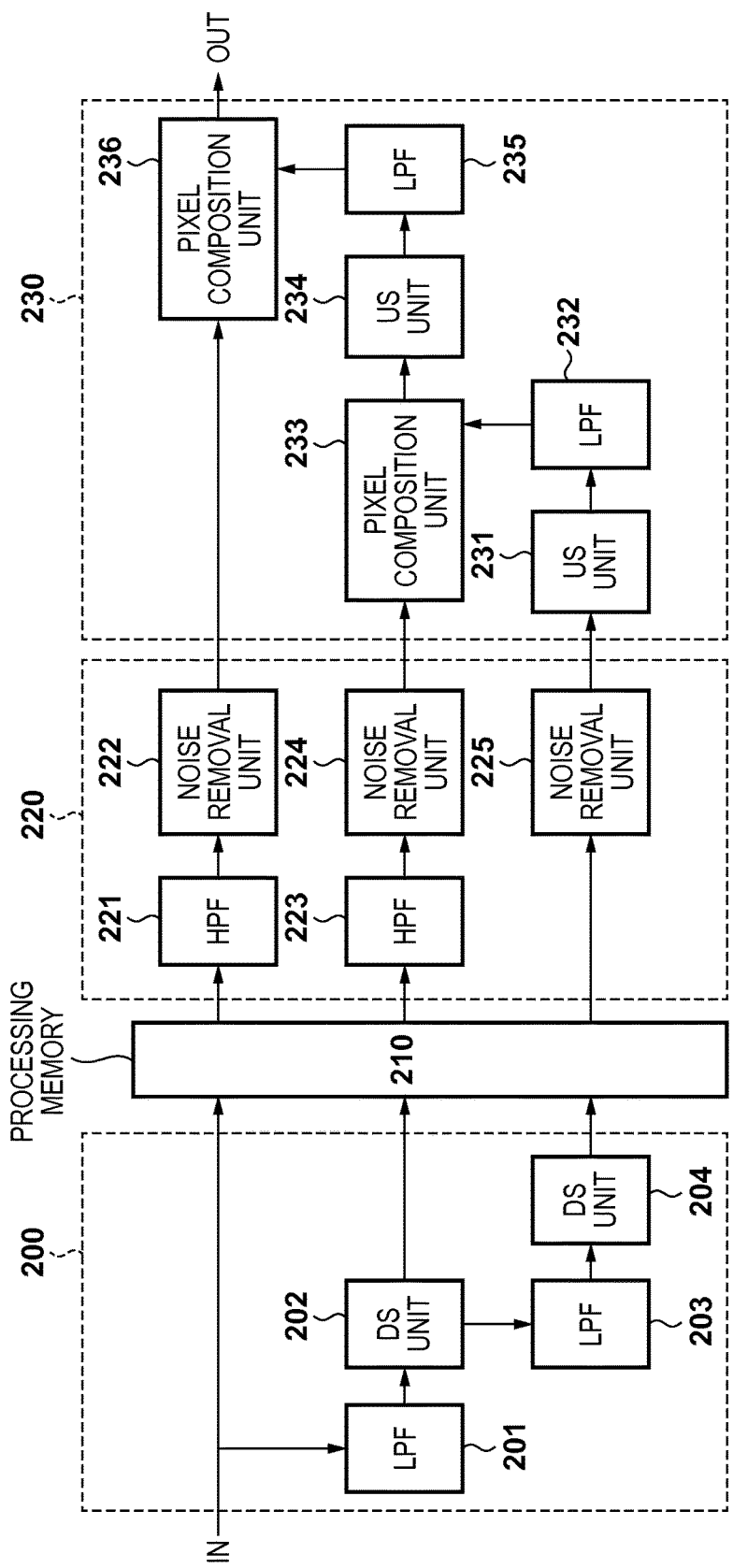
FIG. 2 is a block diagram exemplifying the arrangement of a signal processing unit 104 regarding layer-specific processing according to the embodiment of the present invention.

Layer-specific processing to be performed by the signal processing unit 104 according to this embodiment will be described with reference to the drawings. FIG. 2 is a block diagram showing the internal arrangement of the signal processing unit 104 regarding layer-specific processing.

As shown in FIG. 2, a separation unit 200, a processing memory 210, a noise reduction unit 220, and a composition unit 230 perform the layer-specific processing and can generate an image in which noise is preferably reduced for each frequency range. In this embodiment, the signal processing unit 104 performs processing of reducing noise respectively in the high frequency range and two types of low frequency ranges of image data, and outputs an image.

The separation unit 200 generates image data (frequency range images) of the two types of low frequency ranges from input RAW data, and stores these data and the RAW data in the processing memory 210. More specifically, the separation unit 200 stores the input RAW data in the processing memory 210 without any change, and also outputs it to a low-pass filter (LPF) 201.

The LPF 201 is a filter that only a predetermined low frequency range of the input RAW data passes through. More specifically, the LPF 201 outputs RAW data of the low frequency range by applying a low-pass filter to, for example, image data of each of the R, G, and B components obtained from RAW data, or data obtained by converting RAW data into a YUV space. The output RAW data is input to a down sampling (DS) unit 202.

The DS unit 202 performs down sampling processing (conversion processing for decreasing the resolution) on the input RAW data of the low frequency range, thereby generating low-resolution image data. Since the high frequency component of image data is removed from image data of the low frequency range, the influence of an information loss by this down sampling processing is small, unlike thinning processing. Since down sampling processing decreases the resolution of image data, that is, the number of pixels, the circuit scale in noise removal processing (to be described later) can be reduced, and the calculation amount regarding noise removal processing can be decreased. The level of down sampling processing is decided in accordance with a transfer function applied by the LPF 201. For example, when the transfer function of the LPF 201 is expressed by $H(z)=\frac{1}{2}(1+Z-1)$, the DS unit 202 performs processing of halving the numbers of pixels in the horizontal and vertical directions. The DS unit 202 stores the low-resolution image data (first low-frequency-range image data) in the processing memory 210, and outputs the data to an LPF 203.

The LPF 203 and a DS unit 204 are the same components as the LPF 201 and the DS unit 202. The LPF 203 and the DS unit 204 further perform processing of extracting image data of the low frequency range from the input first low-frequency-range image data and decreasing the resolution. The DS unit 204 stores, in the processing memory 210, low-resolution image data (second low-frequency-range image data) obtained by down sampling processing.

The following description assumes that image data stored in the processing memory 210 from the separation unit 200 according to this embodiment are RAW data, the first low-frequency-range image data in which the numbers of pixels in the horizontal and vertical directions are ½ of those of the RAW data, and the second low-frequency-range image data in which the numbers of pixels in the horizontal and vertical directions are ¼. Also, assume that the first low-frequency-range image data and the second low-frequency-range image data undergo synchronization processing for convenience and are output because the DS unit 202 or the DS unit 204 generates one pixel from four pixels, that is, two pixels in the horizontal direction×two pixels in the vertical direction.

The noise reduction unit 220 executes noise removal processing on RAW data or image data stored in the processing memory 210. In FIG. 2, three, first, second, and third lines are arranged and illustrated sequentially from the top in the vertical direction on the drawing. These lines explicitly indicate data input to the respective lines when outputting image data for saving. That is, RAW data is stored in the processing memory 210 from the separation unit 200 via the first line, the first low-frequency-range image data is stored via the second line, and the second low-frequency-range image data is stored via the third line. When outputting image data for saving, RAW data is input to the first line of the noise reduction unit 220, the first low-frequency-range image data is input to the second line, and the second low-frequency-range image data is input to the third line.

A high-pass filter (HPF) 221 is a filter that only a predetermined high frequency range of input image data, such as an edge component, passes through. More specifically, when RAW data is input, the HPF 221 outputs RAW data of the high frequency range by applying a high-pass filter to, for example, image data of each of the R, G, and B components. The output RAW data is input to a noise removal unit 222. The transfer function of the HPF 221 may be, for example, $H(z)=\frac{1}{2}(1-Z-1)$. Assume that synchronization processing is also performed when the HPF 221 applies the high-pass filter to RAW data.

The noise removal unit 222 removes noise from the image data input from the HPF 221. Noise removal may adopt a method of detecting, for example, the representative direction of an edge component included in image data, and applying a low-pass filter along the detected representative direction to perform smoothing.

The arrangements of an HPF 223 and noise removal unit 224 on the second line are the same as those of the HPF 221 and noise removal unit 222 on the first line. A noise removal unit 225 on the third line is identical to the noise removal units 222 and 224.

In the noise reduction unit 220 according to this embodiment, data are synchronized at the time of input to the respective noise removal units. This is because image information is less lost in comparison with dot-sequential image data, and noise can be suppressed at high precision in noise removal processing.

The composition unit 230 composites image data of a plurality of frequency ranges when outputting image data. More specifically, image data input to the respective three lines have different resolutions. First, an up sampling (US) unit 231 or 234 makes the resolutions of composition target image data match each other. When interpolation is performed in up sampling, the frequency range of the up-sampled image data changes. Thus, LPFs 232 and 235 are arranged at the subsequent stages of the US units 231 and 234, and perform processing of returning the frequency range to an original one. The image data of different frequency ranges having the same resolution are composited into one image data by a pixel composition unit 233 or 236. For example, when outputting image data for saving, the composition unit 230 composites the noise-reduced high-frequency-range image data, first low-frequency-range image data, and second low-frequency-range image data.

<<Display/Saving Processing>>

Practical processing will be explained with reference to the flowchart of FIG. 3 as display/saving processing to be performed by the digital camera 100 having the above arrangement according to this embodiment. The display/saving processing is processing representing an operation when performing processing of saving an image during image capturing/saving such as continuous shooting of sequentially performing image capturing, and in addition, displaying the image as the electronic viewfinder on the display unit 109. Processing corresponding to this flowchart can be implemented when, for example, the CPU 108 reads out a corresponding processing program stored in the ROM, and loads and executes it in the RAM to control the signal processing unit 104 and the image processing unit 105. In the following description, the display/saving processing starts when, for example, RAW data sequentially obtained by image capturing are input to the signal processing unit 104.

In step S301, the signal processing unit 104 causes the separation unit 200 to generate first low-frequency-range image data and second low-frequency-range image data from input RAW data. The signal processing unit 104 stores the respective data in the processing memory 210.

In step S302, the signal processing unit 104 selects, from the data stored in the processing memory 210, data used to generate image data for display on the display unit 109. More specifically, the signal processing unit 104 selects data used to generate image data for display, from the RAW data, the first low-frequency-range image data, and the second low-frequency-range image data in accordance with the display resolution (number of pixels) of the display unit 109. For example, a case will be examined, in which the display resolution of the display unit 109 is 640 pixels in the horizontal direction×480 pixels in the vertical direction, and the resolution of RAW data is 2,560 pixels in the horizontal direction×1,920 pixels in the vertical direction. At this time, the resolution of the first low-frequency-range image data is 1,280 pixels in the horizontal direction×960 pixels in the vertical direction, and the resolution of the second low-frequency-range image data is 640 pixels in the horizontal direction×480 pixels in the vertical direction. The signal processing unit 104 determines that the second low-frequency-range image data matches image data for display, and selects it as data to be used. For example, a case will be examined, in which the display resolution of the display unit 109 is 640 pixels in the horizontal direction×480 pixels in the vertical direction, and the resolution of RAW data is 1,280 pixels in the horizontal direction×560 pixels in the vertical direction. At this time, the resolution of the first low-frequency-range image data is 640 pixels in the horizontal direction×480 pixels in the vertical direction, and the resolution of the second low-frequency-range image data is 320 pixels in the horizontal direction×240 pixels in the vertical direction. The signal processing unit 104 determines that the first low-frequency-range image data and second low-frequency-range image data having resolutions equal to or lower than that of the display unit 109 match image data for display, and selects the first low-frequency-range image data and second low-frequency-range image data as data to be used. That is, in this step, the signal processing unit 104 selects data having a resolution lower than the display resolution, as data used to generate image data for display.

In step S303, the signal processing unit 104 causes the noise reduction unit 220 to perform noise removal processing on the data used to generate image data for display. More specifically, the signal processing unit 104 inputs data to be used to the first to third lines of the noise reduction unit 220 in the descending order of the resolution, and performs noise removal processing. For example, when data to be used is only the second low-frequency-range image data, the signal processing unit 104 inputs the second low-frequency-range image data to the first line, and causes the noise reduction unit 220 to output image data from which noise of the high frequency range has been removed. For example, when data to be used are the first low-frequency-range image data and the second low-frequency-range image data, the signal processing unit 104 inputs the first low-frequency-range image data to the first line and the second low-frequency-range image data to the second line. Then, the signal processing unit 104 causes the noise reduction unit 220 to output image data of two types of resolutions from which noise of the high frequency range has been removed.

In step S304, the signal processing unit 104 causes the composition unit 230 to perform up sampling processing, application of an LPF, and composition processing, as needed, and outputs image data for display. More specifically, when image data are input to a plurality of lines in step S303, the signal processing unit 104 performs composition processing of the image data in step S304. When image data is input to only the first line in step S303, the signal processing unit 104 directly outputs, as image data for display, image data in which noise has been reduced without performing composition processing by the composition unit 230 in step S304.

In step S305, the signal processing unit 104 performs other signal processes (for example, gamma processing, interpolation processing, and matrix transformation) on the image data for display.

At this time, the processing of the signal processing unit 104 regarding the image data for display is completed. Subsequently, the CPU 108 in parallel performs display processing of the image data for display and saving processing of image data for saving.

In step S306, the image processing unit 105 applies, to the image data for display, image processing such as color adjustment necessary for display on the display unit 109, thereby generating an image signal for display. The image processing unit 105 outputs the image signal for display to the display unit 109 to display an image serving as the electronic viewfinder. After that, the processing regarding display, out of the display/saving processing, is completed.

In step S307, the signal processing unit 104 causes the noise reduction unit 220 to perform noise removal processing on all data stored in the processing memory 210. More specifically, the signal processing unit 104 inputs the RAW data to the first line, the first low-frequency-range image data to the second line, and the second low-frequency-range image data to the third line, and performs noise removal processing.

In step S308, the signal processing unit 104 causes the composition unit 230 to perform up sampling processing, application of an LPF, and composition processing, and outputs image data for saving. In step S309, the signal processing unit 104 performs other signal processes (for example, gamma processing, interpolation processing, and matrix transformation) on the image data for saving.

In step S310, the image processing unit 105 applies, to the image data for saving, image processes such as color adjustment and enlargement/reduction necessary for saving on the recording medium 110. Further, the image processing unit 105 applies necessary processing such as encoding processing, completing the image data for saving.

In step S311, the CPU 108 transmits the generated image data for saving to the recording medium 110 to save it, and then completes the processing regarding saving, out of the display/saving processing.

Accordingly, the display unit 109 can display an image having synchronism with image data to be saved. The method according to this embodiment can decrease the readout count, compared to the method described in Japanese Patent Laid-Open No. 2005-142707 for one image recording and display, and thus can cancel the display delay. More specifically, as shown in FIG. 4A, the method in Japanese Patent Laid-Open No. 2005-142707 performs processing regarding image data for display (monitor image) after performing sensor readout twice, and then presents an image on the display unit 109. To the contrary, as shown in FIG. 4B, the method according to this embodiment performs processing regarding image data for display after performing sensor readout once, and then presents an image on the display unit 109. The method according to this embodiment can therefore shorten the delay time from shooting to display. In general, the display resolution of the display unit 109 is lower than the resolution of image data for saving. Therefore, the method according to this embodiment uses not all frequency range images but only some frequency range images to generate image data for display. That is, the time taken for processing regarding display is shorter than the time taken for processing regarding saving, so the start timing of the processing regarding saving can be quickened in comparison with the conventional method.

In the method according to this embodiment, image data for display is an image generated by the low-pass filter and down sampling, unlike an image generated by conventional pixel thinning. Thus, even the image quality is improved.

As described above, the image processing apparatus according to this embodiment can ensure the synchronism between an image saved during image capturing/saving and an image displayed as the electronic viewfinder. More specifically, the image processing apparatus generates a plurality of frequency range images by separating an image based on an obtained image signal into predetermined frequency ranges. Then, the image processing apparatus generates an image for saving based on a plurality of images by applying predetermined image processing to a plurality of frequency range images. Also, the image processing apparatus generates an image for display based on some of the plurality of frequency range images to which the predetermined image processing has been applied.

[Modification]

In the above-described embodiment, data used to generate image data for display is selected based on only the display resolution of the display unit 109. However, the practice of the present invention is not limited to this.

For example, when it is set to give priority to improvement of the image quality or resolution of an image to be displayed on the display unit 109, the signal processing unit 104 may select data having a resolution higher than the display resolution in display/saving processing of step S302. Alternatively, the signal processing unit 104 may select data having a resolution higher than the display resolution and one or more data having a resolution lower than this resolution. For example, a case will be examined, in which the display resolution of the display unit 109 is 640 pixels in the horizontal direction×480 pixels in the vertical direction, and the resolution of RAW data is 2,000 pixels in the horizontal direction×1,500 pixels in the vertical direction. At this time, the resolution of the first low-frequency-range image data is 1,000 pixels in the horizontal direction×750 pixels in the vertical direction, and the resolution of the second low-frequency-range image data is 500 pixels in the horizontal direction×375 pixels in the vertical direction. The signal processing unit 104 may determine that the first low-frequency-range image data matches image data for display, and select the first low-frequency-range image data as data to be used. Since the image quality is improved by compositing image data of a plurality of frequency ranges, the signal processing unit 104 may determine that the first low-frequency-range image data and the second low-frequency-range image data match image data for display, and select them as data to be used.

For example, when it is set to give priority to the response performance so as to shorten the delay time till display on the display unit 109 after image capturing, the signal processing unit 104 may select only one data in display/saving processing of step S302 regardless of the display resolution. For example, as in the above-described example, even when the resolution of the second low-frequency-range image data is 500 pixels in the horizontal direction×375 pixels in the vertical direction and is lower than the display resolution of 640 pixels in the horizontal direction×480 pixels in the vertical direction, the signal processing unit 104 may select the second low-frequency-range image data as data to be used. In this case, the image processing unit 105 applies processing of enlargement up to the display resolution. With this processing, the calculation amount of noise removal processing in the noise reduction unit 220 can be reduced, and composition processing in the composition unit 230 can be skipped. Hence, the display delay amount can be reduced, as shown in FIG. 5, compared to the method of the above-described embodiment. Note that it is also possible to select, as data to be used, one data having a resolution higher than the display resolution, like the first low-frequency-range image data, and reduce the image data by the image processing unit 105 at the time of display. However, in terms of reducing the calculation amount regarding noise reduction, it is preferable to use the smallest number of data, as a matter of course.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-014743, filed Jan. 29, 2014, which is hereby incorporated by reference herein in its entirety.

What is claimed is:

1. An image processing apparatus comprising:
an obtaining unit which obtains an image signal output by image capturing;
a separation unit which generates, from the image signal obtained by the obtaining unit, a plurality of image signals each having a different resolution, wherein the plurality of image signals include a first age signal and a second image signal having a rawer resolution than the first image signal;
an image processing unit which applies predetermined image processing to each of the plurality of image signals generated by the separation unit;
a generation unit which generates an image signal for saving using the first and second image signals to which the image processing unit have applied the predetermined image processing, and generates
an image signal for display using the second image signal to which the image processing unit has applied the predetermined image processing and without using the first image signal.

2. The apparatus according to claim 1, wherein the predetermined image processing by the image processing unit includes noise reduction processing.

3. The apparatus according claim 1 wherein the resolution of the first image signal is higher than a resolution of a display unit which displays the image signal for display.

4. The apparatus according to claim 3, wherein in a case where a setting to give priority to image quality of the image for display is made, the generation unit generates the image signal for display with the first and second image signals to which the image processing unit, has applied the predetermined image processing.

5. The apparatus according to claim 3, wherein the image signal for display has a resolution lower than a resolution of the image for saving.

6. The apparatus according to claim 1, wherein
the obtaining unit sequentially obtains image signals output by image capturing performed sequentially, and
the generation unit generates the image signal for saving after generating the image signal for displaying.

7. The apparatus according to claim 1, wherein the generation unit generates the image signal for saving by compositing a plurality of image signals including the first and second image signals to which the predetermined image processing has been applied.

8. The apparatus according to claim 7, wherein the generation unit generates the image signal for display by compositing the second image signal and one or more image signal having a lower resolution than he second image signal, to which the predetermined image processing have been applied.

9. The apparatus according to claim 7, wherein the signal processing unit generates a fourth image signal by compositing the second image signal and one or more image signal having a lower resolution than the second image signal, to which the predetermined image processing have been applied.

10. An image capturing apparatus comprising:
an image capturing unit which outputs an image signal by image capturing;
a separation unit which generates, from the image signal obtained by the obtaining unit, a plurality of image signals each having a different resolution, wherein the plurality of image signals include a tart image signal and a second image signal having a lower resolution than the first image signal;
an image processing unit which applies predetermined image processing to each of the plurality of image signals generated by the separation unit;
a generation unit which generates an image signal for saving using the first and second image signals to which the image processing unit have applied the predetermined image processing, and generates an image signal for display using the second image signal to which the image processing unit has applied the predetermined image processing and without using the first image signal;
a display unit which displays the image signal for display; and
a saving unit which saves, on a recording medium, the age signal for saving.

11. A method of controlling an image processing apparatus, comprising:
an obtaining step of obtaining an image signal output by image capturing;
a separation step of generating, from the image signal obtained by the obtaining unit, a plurality of image signals each having a different resolution, wherein the plurality of image signals include a first image signal and a second image signal having a lover resolution than the first image signal;
an image processing step of applying predetermined image processing to each of the plurality of image signals generated in the separation step;
a generation step of generating an image for saving using the first and second image signals to which the predetermined image processing have been applied in the image processing step,
and generating an image for display using the second image signal to which the predetermined image processing has been applied in the image processing step and without using the first image signal.

12. A non-transitory computer-readable recording medium recording a program for causing a computer to perform:
obtaining an image signal output by image capturing;
generating, from the image signal obtained by the obtaining unit, a plurality of image signals each having a different resolution, wherein the plurality of image signals include a first image signal and a second image signal having a lower resolution than the first image signal;
applying predetermined image processing to each of the plurality of generated image signals;
generating an image for saving using the first and second image signals which the predetermined image processing have been applied; and
generating an image for display using the second image signal to which the predetermined image processing has been applied and without using the first image signal.

13. An image processing apparatus comprising:
an obtaining unit which obtains an image signal output by image capturing;
a separation unit which generates, from the image signal obtained by the obtaining unit, a plurality of image signals each having a different resolution, wherein the plurality of image signals include a first image signal and a second image signal having a lower resolution than the first image signal;
a noise reduction processing unit which applies noise reduction processing to each of the plurality of image signals generated by the separation unit; and
a signal processing, unit which generates a third image signal using the first and second image signals to which the noise reduction processing has been applied, generates a fourth image signal using the second image signal to which the noise reduction processing has been applied and without using the first mage signal, and applies to the third and fourth image signals at least one process of gamma processing, interpolation processing, and matrix transformation.

14. The apparatus according to claim 13, wherein the signal processing unit generates the third image signal by compos ting a plurality of image signals including the first and second image signals to which the noise reduction processing has been applied.

15. A method of controlling an mage processing apparatus, comprising:
obtaining an image signal output by image capturing;
generating, from the obtained image signal, a plurality of image signals each having a different resolution, wherein the plurality of image signals include a first image signal and a second image signal having a lower resolution than the first image signal;
applying noise reduction processing to each of the plurality of generated image signals;
generating a third image signal using the first and second image signals to which the noise reduction processing has been applied;
generating a fourth image signal using the second image signal to which the noise reduction processing has been applied and without using the first image signal; and
applying to the third and fourth image signals at least one process of gamma processing, interpolation processing, and matrix transformation.

16. A non-transitory computer able recording medium recording a program for causing a computer to perform:
obtaining an image signal output by image capturing;
generating, from the obtained image signal, a plurality of image signals each having a different resolution, wherein the plurality of image signals include a first image signal and a second image signal having a lower resolution than the first image signal;
applying noise reduction processing to each of the plurality of generated image signals;
generating a third image signal using the first and second image. signals to which the noise reduction processing has been applied;
generating a fourth image signal using the second image signal to which the noise reduction processing has been applied and without using the first image signal; and
applying to the third and fourth image signals at least one process of gamma processing, interpolation processing, and matrix transformation.

* * * * *